United States Patent [19]

Monte et al.

[11] 4,226,292
[45] Oct. 7, 1980

[54] MINIATURE TARGET VEHICLE

[76] Inventors: Anthony J. Monte, 47660 Bluebird, Utica, Mich. 48087; Ernest C. Wahoski, 20489 Lancaster, Harper Woods, Mich. 48225

[21] Appl. No.: 8,319

[22] Filed: Feb. 1, 1979

[51] Int. Cl.³ .......................... B62D 55/02; F41J 9/02
[52] U.S. Cl. .......................................... 180/6.5; 35/25; 46/254; 180/9.2 R; 180/9.32; 273/359; 280/1.1 R
[58] Field of Search ......................... 180/6.5, 9.2, 9.32; 280/1.1 R; 301/63 R; 305/35 EB; 46/254; 273/105.2, 105.6; 35/25

[56] References Cited

U.S. PATENT DOCUMENTS

| 3,166,138 | 1/1965 | Dunn et al. | 180/9.32 |
| 3,856,104 | 12/1974 | Ohba | 180/6.5 |
| 3,917,270 | 11/1975 | Gothard, Jr. et al. | 280/1.1 R |
| 4,080,602 | 3/1978 | Hattori et al. | 46/254 |
| 4,155,554 | 5/1979 | Adamski et al. | 280/1.1 R |

FOREIGN PATENT DOCUMENTS

| 2419553 | 10/1975 | Fed. Rep. of Germany | 180/6.5 |
| 374915 | 9/1939 | Italy | 180/9.32 |

OTHER PUBLICATIONS

"1975 Radio Control Buyers Guide," Publ. by Boynton & Assoc., 8001 Forbes Place, Suite 210D, Springfield, Va. 22151.

Primary Examiner—John J. Love
Assistant Examiner—Donn McGiehan
Attorney, Agent, or Firm—Peter A. Taucher; John F. Schmidt; Nathan Edelberg

[57] ABSTRACT

A track-laying, remotely controlled, miniature target vehicle is shown, bearing an expendable shell which resembles a military tank. Four grooved pulleys on each side carry two V-belts as tracks, one wheel being electric motor-driven. The two reversible electric motors, one for each side, run and are controlled independently of each other by means of speed control units receiving signals from an on-board radio receiver. A transmitter remote from the simulated battlefield is under the control of a tank commander who puts the tank through realistic maneuvers. More remote visual control is provided by an auxiliary control device electrically connected to the transmitter and which is cooperable with an optical instrument, being attached for example to the two telescopes of optical binoculars by quick-releasable straps.

5 Claims, 7 Drawing Figures

Fig-1

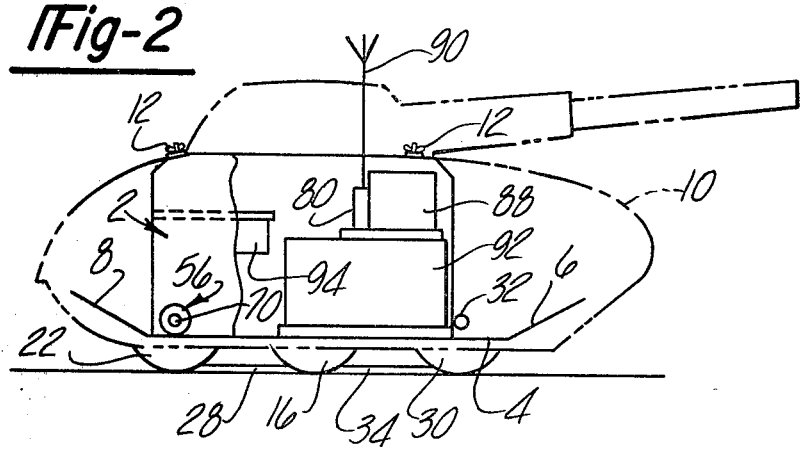
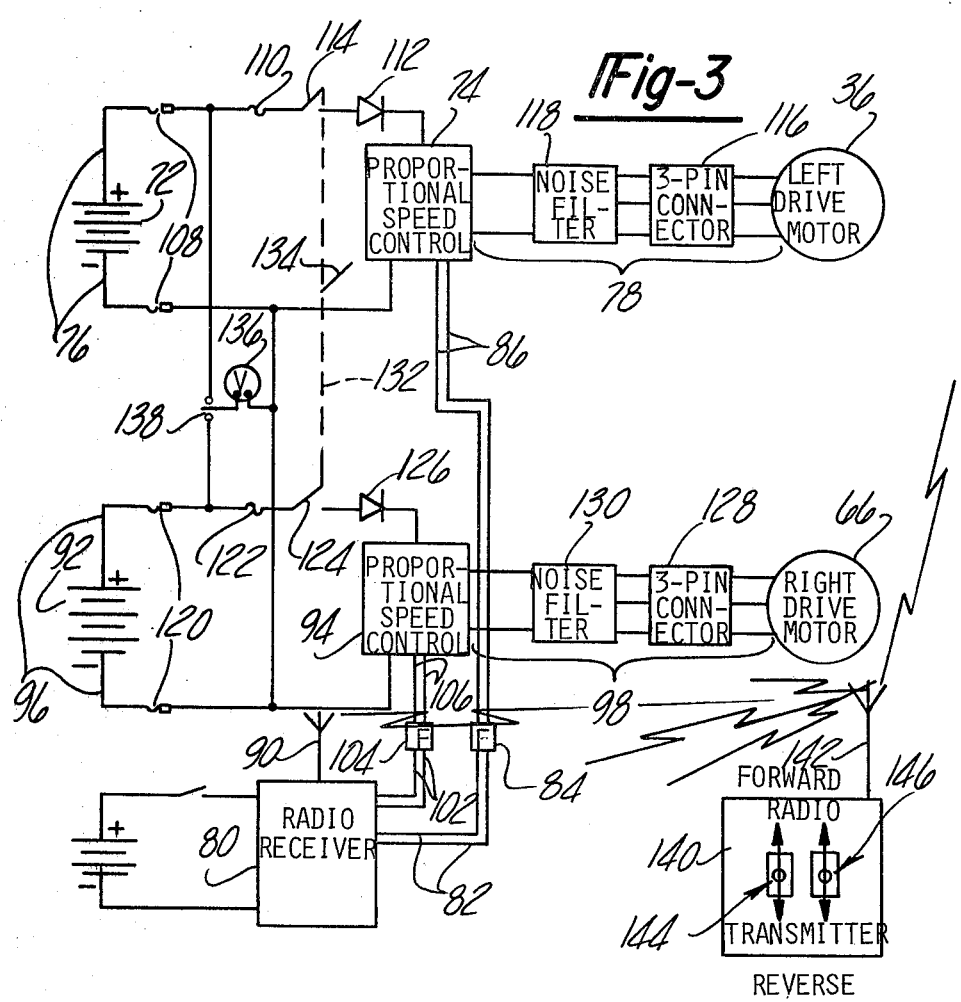

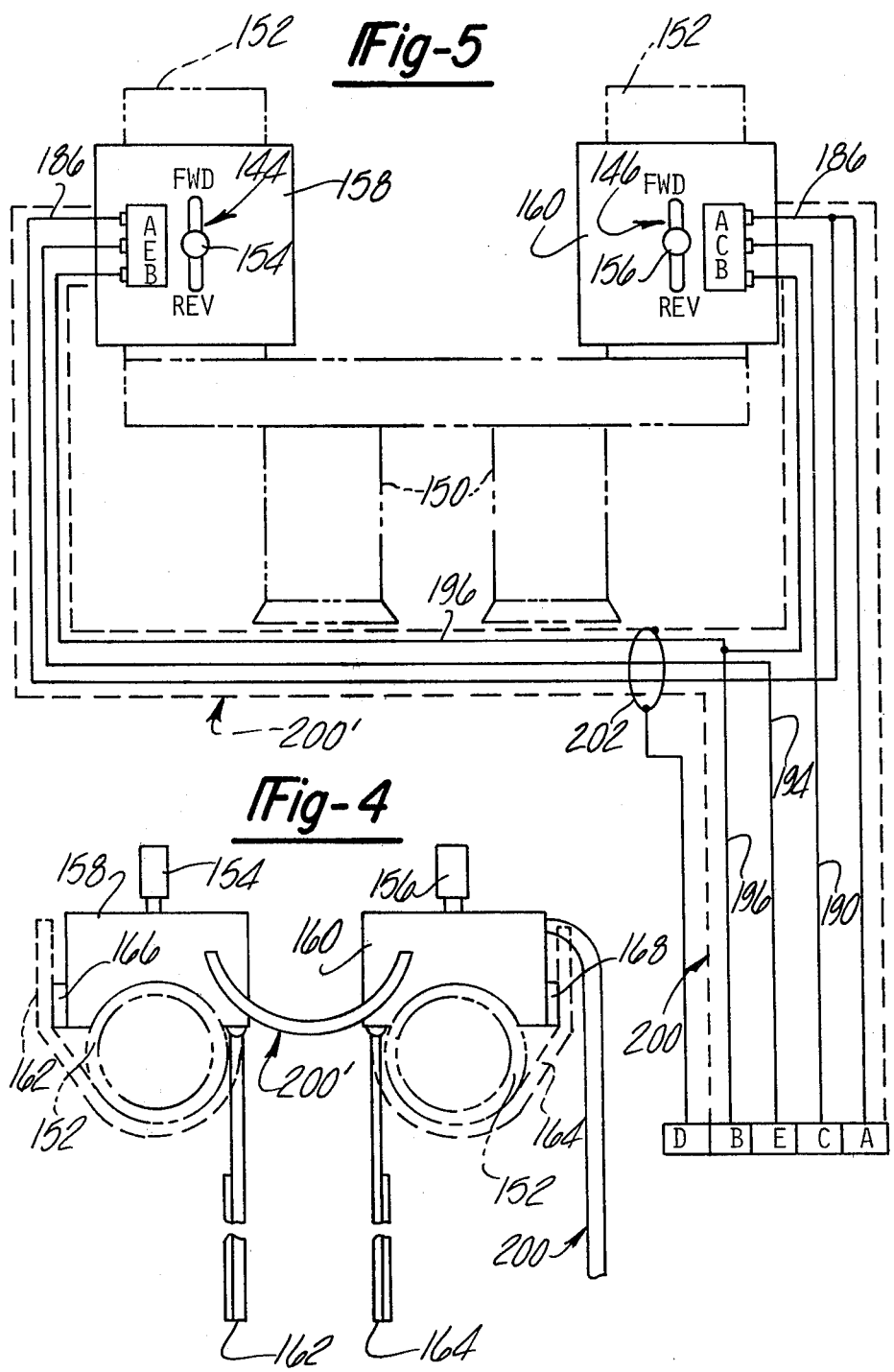

MINIATURE TARGET VEHICLE

BACKGROUND AND SUMMARY OF PRIOR ART

The closest prior art known to the inventors and to the attorney (Mr. Schmidt) who prepared this application is:

1. Patent application Ser. No. 799,022, filed May 20, 1977, U.S. Pat. No. 4,155,554, issued May 22, 1979, the invention of Ignatious E. Adamski and Clarence H. Winfree, assignors to the Government of the United States of America, titled MINIATURE TARGET TANK, along with prior art of record in the Adamski et al file;

2. Commercially available remote controls for vehicles of all sorts. We refer in particular to a "1975 RADIO CONTROL BUYERS GUIDE" published by Boynton & Assoc., 8001 Forbes Pl., Suite 210D, Springfield, Virginia 22151.

SUMMARY OF THE INVENTION

There are three aspects of the invention:

1. Mechanical, comprising the miniature vehicle which simulates a track-layer, is provided with four wheels on each side in two pairs of coplanar wheels, each pair carrying a V-belt, one wheel driven by suitable drive means.

2. An electric drive for a miniature vehicle, of which each side is electric motor-driven and is controlled independently of the drive for the opposite side, and both motors are remotely controlled by radio.

3. Remote visual control, in which the naked eye is aided by means usually optical, utilizing an auxiliary control device supported by the optical means and working through the radio in accordance with observations made visually through the visual aid means.

IN THE DRAWINGS

FIG. 1 is a top plan, largely schematic, view of the basic vehicle with the expendable shell shown in outline.

FIG. 2 is a view in section substantially on the plane of line 2—2 of FIG. 1, and on a smaller scale than that of FIG. 1.

FIG. 3 is a circuit diagram of the electric drive and the basic radio control system, and it includes the physically detached radio transmitter shown in the lower right-hand corner.

FIG. 4 is front elevation view of the auxiliary, extended vision, control means and a possible relation with a visual aid instrument.

FIG. 5 is a top plan view of the combination shown in FIG. 4, but also illustrating the electric circuitry.

THE MECHANICAL ASPECTS

Figure 6:
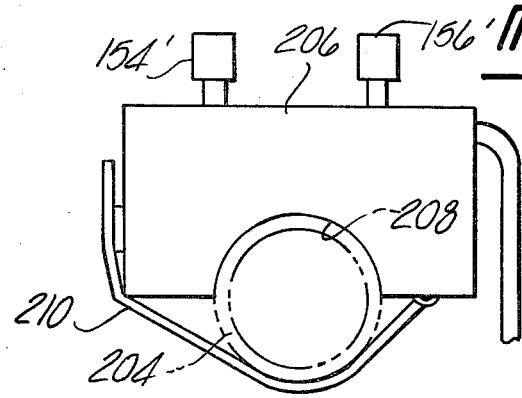
FIG. 6 is a front elevation view similar to FIG. 4 but showing an extended vision auxiliary control means with a monocular visual aid instrument.

Even though the remotely controlled miniature target vehicle is a completely integrated machine, at this juncture will be described the principally mechanical aspects of the invention. Thus, a metal box 2 is provided as the exoskeletal basic supporting structure of the vehicle.

In a preferred embodiment, box 2 is a five-sided structure open at the bottom as the vehicle stands in FIG. 2. A bottom plate 4 is removably secured to the five-sided box 2 by conventional means in a manner not shown. An approach ramp 6 and a rear ramp 8 are formed integral with bottom plate 4 and are provided as an aid to the successful negotiation of small obstacles in the direct line of movement.

To simulate realism for the antitank gunner trainees firing at the miniature targets, we provide an expendable shell 10 shaped and colored to resemble a combat tank. Shell 10 is secured to box 2, for easy removal and replacement, by a plurality of threaded fasteners, here shown as wing-nuts 12.

As Adamski and Winfree point out in the above-referenced patent, box 2 is preferably formed of steel armor plate about 0.07 inch thick, and can survive subcaliber small arms fire of the type used in such training exercises. The expendable shell 10 is of course destroyed and can be replaced.

Because the "tank" exterior, usually a synthetic resin, is merely a shell, that shell itself is open at the bottom and so does not provide the target vehicle with the approach ramp of a normal, full-size, tank. To overcome that deficiency, the ramps 6 and 8 referenced above are formed as part of bottom plate 4. It will be evident that, in reverse movement, the approach ramp function is provided by ramp 8.

The vehicular mobility function is performed by four wheels on each side of the vehicle. Preferably, the wheels have peripheral V-shaped grooves to receive V-belts which perform as the endless tracks of a tracklaying vehicle. Such wheels are commercially available as pulleys for V-belt systems.

Two of such four wheels are shown at 14 and 16, and are coaxial by virtue of a common axle 18 to which they are secured so as to rotate together; that is, either wheel 14 or 16 is drivably connected to the other because both are secured to and rotate with axle 18. Axle 18 in turn is conventionally mounted on box 2 for rotation relative thereto by any suitable means shown at 20.

A third wheel 22 of said four wheels is mounted to rotate on an axis 24 by conventional means shown generally at 26. Wheel 22 is coplanar with wheel 14 so that the two coplanar wheels 14 and 22 can support a V-belt 28 which functions as an endless belt to provide the vehicle with tracklayer characteristics. Similarly, the fourth wheel 30 of said four wheels is rotatable on an axle 32, is coplanar with wheel 16, and the two coplanar wheels 16 and 30 support a V-belt 34.

Figure 1:
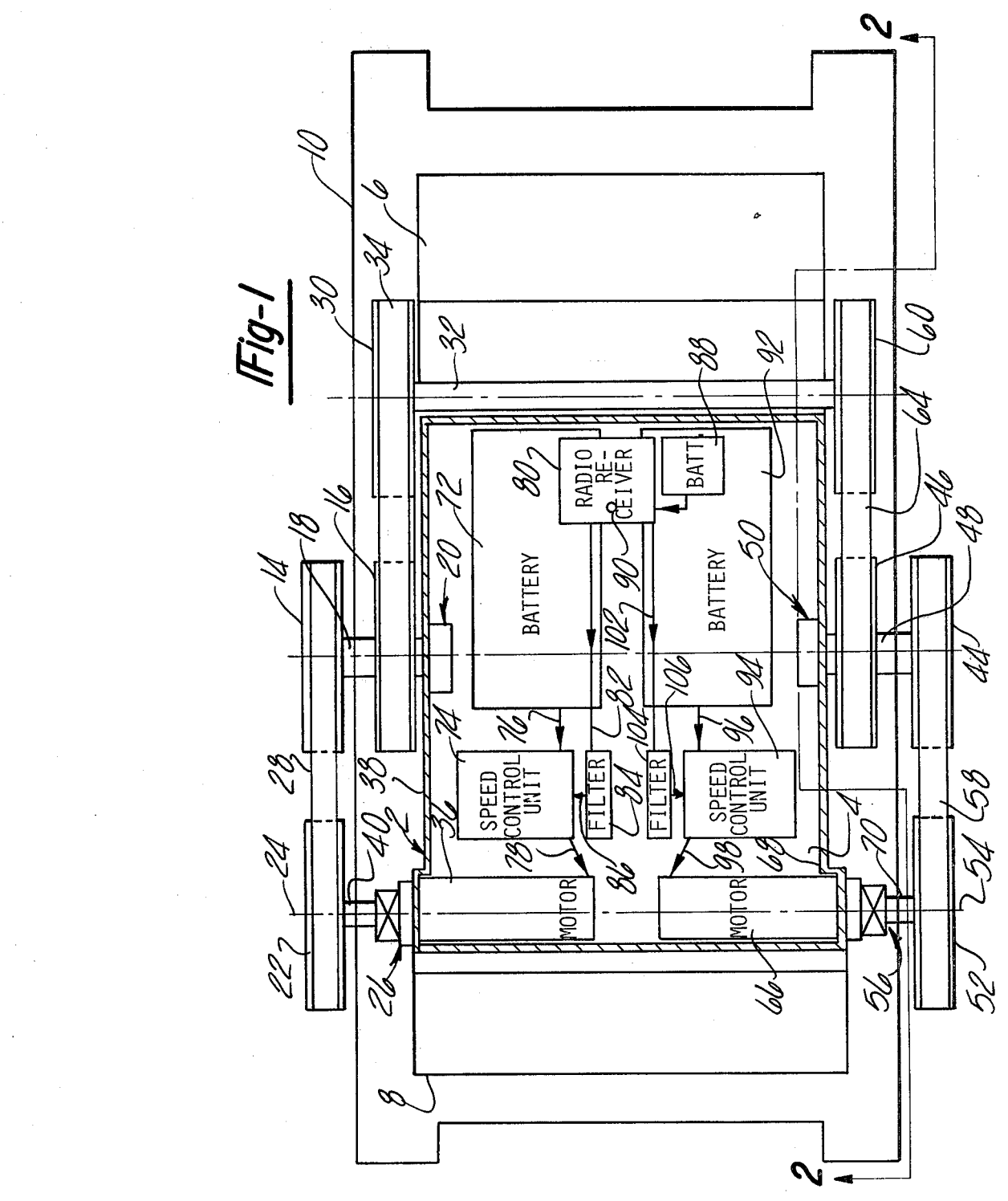

A drive motor 36 is suitably secured to the left sidewall 38 of box 2 and drives wheel 22 by means of an axle shaft 40. In turn, wheel 22 drives wheel 14 by means of V-belt 28, wheel 14 drives wheel 16 as aforesaid, and wheel 16 drives wheel 30 by means of V-belt 34. It will be evident from FIG. 1 that the feature of offset planes for V-belts 28 and 34 gives the miniature vehicle a stability that is highly desirable in view of the magnified effect which small variations in terrain would otherwise have on the miniature vehicle.

The right side of the vehicle carries four wheels in an arrangement which is a mirror image of the system described above for the left side. Thus, wheels 44 and 46 are coaxially mounted for rotation together by means of axle 48, which is secured by any conventional means 50 to the side of box 2 in the same manner that the means 20 rotatably carries axle 18 and its coaxial wheels 14 and 16.

Wheel 44 is coplanar with a wheel 52 mounted for rotation on an axis 54; axes 24 and 54 are here shown as coincident. A conventional means 56 rotatably supports wheel 52, and V-belt 58 is carried by coplanar wheels 44 and 52. Wheel 60 is coplanar with wheel 46 and is rotatable on axle 32; wheels 46 and 60 support V-belt 64.

A drive motor 66 is conventionally mounted on the right sidewall 68 of box 2 and drives wheel 52 by means of an axle shaft 70. Wheel 52 drives wheel 44 by means of V-belt 58, wheel 44 drives wheel 46, and wheel 46 drives its coplanar wheel 60 by means of V-belt 64.

THE RADIO CONTROLLED ELECTRIC DRIVE

Drive motors 36 and 66 are electrically powered. A battery 72 is connected with a proportional speed control unit 74 by means of a cable 76. The output of proportional speed control unit 74 goes to motor 36 via a cable 78. Control of motor 36 is by the switching mechanism in speed control unit 74. An onboard radio receiver 80 is wire-connected (cable 82) with a noise filter 84 which is connected by a cable 86 with speed control unit 74. A battery 88 is the energy source for radio receiver 80, which receives signals through an antenna 90.

For the drive of the right side of the vehicle, a battery 92 is connected with another proportional speed control unit 94 by a cable 96. Cable 98 conducts the output of speed control unit 94 to motor 66. Radio receiver 80 is wire connected as at 102 with a noise filter 104 which is cable connected, as at 106, with speed control unit 94.

The electrical system is disclosed in more detail in FIG. 3. As can there be seen, the circuit of cable 76 can be broken by means of a two-prong connector 108, and the positive connection includes a fuse 110, a diode 112, and a switch 114. Cable 78 connects speed control unit 74 with motor 36, and that circuit can be interrupted by a three-pin connector 116. Cable 78 preferably includes a noise filter 118.

In like manner for the right drive motor 66, cable 96 provides an electrical connection which can be interrupted by a two-prong connector 120, and the positive connection includes a fuse 122, a switch 124, and a diode 126. Cable 98 provides a circuit between control unit 94 and motor 66 and includes a three-pin connector 128 and a noise filter 130.

Switches 114 and 124 are mechanically connected and operated by a non-conductive bar 132 and a handle 134. A voltmeter 136 can if desired be connected across the terminals of batteries 72 and 92 in parallel and through a switch 138.

The system includes a radio transmitter 140 having an antenna 142, as well as left and right motor controls 144 and 146 respectively.

Much of the circuitry and componentry here shown is commercially available. Many hobby shops have a wide selection of rechargeable dry battery packs suitable for use in equipment such as that of the invention here disclosed. Radio receivers and transmitters also have extensive use in model airplanes and other such applications. Broadcasting and receiving systems are so widely and generally available and so well understood that no elaboration is required.

The circuitry comprising the two systems: 74, 118, 116; and 94, 130, 128 (FIG. 3) is available as a unit from Futaba Industries, U.S.A., 630 West Carob Street, Compton, California 90220 and need not be detailed. Electric motors 36 and 66 are also commercially available. One example is made by TRW/Globe Motors and a suitable model is Part No. 102A180 having a 17/8" mounting flange.

THE EXTENDED VISUAL CONTROL SYSTEM

Even though radio transmission-reception systems such as the one disclosed in FIG. 3 have a usable range up to approximately one mile, the unaided human eye will usually have difficulty perceiving models of the contemplated one tenth scale beyond about one quarter of a mile. Accordingly, the invention here disclosed and claimed contemplates an extended vision control system which will give users of the invention the practical use of such a training system closer to the one mile (approximately) limit of effective radio control.

Various ways (e.g., radar) of providing such "extended vision" control will suggest themselves to those skilled in the art. However, for the purpose of illustrating the invention, we have here shown the well-known and quite common expedient of optical magnification of an image such as is provided by a binocular telescopic instrument; persons skilled in the art will recognize from the binocular application that the invention could also be practiced by using a monocular optical telescope.

In FIGS. 4 and 5, the device to extend the vision of the human eye is shown schematically as resembling a binocular optical device having two eyepiece barrels 150 and two objective barrels 152. Observer-operable control handles 154 for the left motor and 156 for the right motor are provided on the housings 158 and 160, respectively, in locations that are readily accessible to the observer's index fingers.

Quick-detachable securing straps 162 and 164 are provided on housings 158 and 160 respectively to wrap around the respective barrels of the visual aid device. Terminal pads 166 and 168 on housings 158 and 160 are provided for engagement by the free ends of straps 162 and 164 respectively, as shown in dotted lines in FIG. 4. Such straps are commercially available from VELCRO Corporation, 681 Fifth Avenue, New York, New York 10022.

Figure 7:
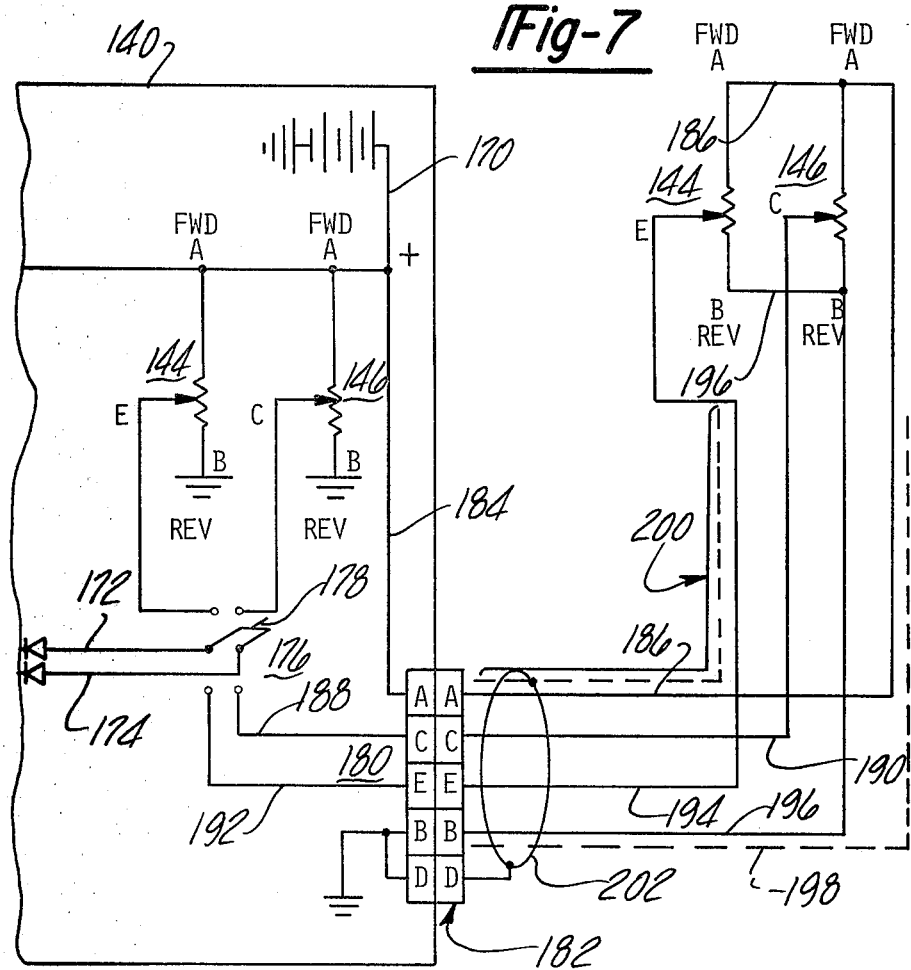
FIG. 7 is a circuit diagram which relates the auxiliary control circuitry to the basic radio transmitter circuit.

Operating circuitry for the extended vision auxiliary control means is best understood by reference to FIG. 7 along with FIG. 5. The alphabetical reference characters A through E, applied to the indicated terminals, are selected to correspond throughout the two views FIGS. 5 and 7.

The discussion supra of FIG. 3 refers to left and right motor controls 144 and 146, which controls include observer-operable control handles 154 and 156 respectively, as pointed out supra in the discussion of FIGS. 4 and 5. In FIG. 6, which relates to an auxiliary control applicable specifically to a monocular device, the handles are referenced by characters 154' and 156'.

As is best seen by reference to FIG. 7, the motor controls 144 and 146 are conventional potentiometers having fixed forward (FWD) terminals A, A, fixed rearward or reverse (REV) terminals B, B, and sliding, spring zero-centered terminals E and C respectively. A portion of the circuitry of transmitter 140 is shown in FIG. 7, and includes an electrical conductor 170 which is secured in any conventional manner to the positive terminal of an electric power source having a grounded negative. The controls 144 and 146 shown in FIG. 7 as part of transmitter 140 (also shown in FIG. 3) are, for the purposes of this invention, connected by means of conductors 172 and 174 to conventional decoders (not here shown) through a double-pole, double-throw switch 176, such circuit being completed with the switch handle 178 in its upper closed position.

In handle 178's lower closed position, the decoders referred to above are connected with the extended vision auxiliary control of this invention. Toward that objective, a receptacle 180 is mounted on a casing wall of transmitter 140 with its five sockets A through E open toward the outside of the transmitter. A five-prong plug 182 is cooperable with receptacle 180, prongs A through E engaging sockets A through E respectively.

Socket A of receptacle 180 is connected by a conductor 184 with conductor 170 and thus to the positive terminal of the energy source carried by transmitter 140. Prong A of plug 182 is connected by conductor 186 with the A terminals of the potentiometers in controls 144 and 146.

Socket C of receptacle 180 is connected by a conductor 188 with conductor 174 when switch 176 is in its lower closed position. Prong C of plug 182 is connected by a conductor 190 with the sliding terminal C of potentiometer 146.

Socket E of receptacle 180 is connected by a conductor 192 with conductor 172 of transmitter 140 when switch 176 is in its lower closed position. Prong E of plug 182 is connected by a conductor 194 with the sliding terminal E of potentiometer 144.

Sockets B and D of receptacle 180 are grounded in any suitable manner. Prong B of plug 182 is connected by a conductor 196 with the B terminals of the potentiometers 144 and 146. Prong D is connected with a shield 198 surrounding the cable 200 made up of conductors 186, 190, 194, and 196, the connection shown schematically by a loop 202.

It will be recognized by those skilled in the art that the binocular embodiment of the invention has an interconnecting cable portion 200' extending between the housings 158 and 160 and comprising conductors 194 and (parts of) 186 and 196, which portion 200' is also suitably shielded and grounded.

The auxiliary control shown in FIG. 6 is adapted to be used with a monocular visual aid shown at 204. Housing 206 is recessed as shown at 208 and is provided with a quick-release strap 210.

OPERATION

THE MECHANICAL ASPECTS

Individually controlled motors 36 and 66 drive their respective road wheels 22 and 52 directly. Wheel 22 is a grooved pulley, as are all of the road wheels. V-belt 28 engages wheels 22 and 14, and thus wheel 14 is driven, and in turn drives wheel 16 through axle 18. Wheel 16 drives V-belt 34, which drives wheel 30.

Similarly on the right side of the vehicle, wheel 52 drives belt 58, which drives wheel 44. Through axle 48, wheel 44 drives wheel 46, which in turn drives the forward wheel 60 through V-belt 64.

THE RADIO CONTROLLED ELECTRIC DRIVE

Motors 36 and 66 are electric, battery-powered. As here shown, battery 72 is connected to drive motor 36 through proportional speed control 74; battery 92 powers motor 66 through proportional speed control 94. Controls 74 and 94 are wire-connected to radio receiver 80 which receives signals broadcast by transmitter 140. Right and left motor controls 146 and 144, respectively, are accessible to the observer-operator who acts as a tank commander as the target vehicle is maneuvered to simulate evasive action and tactical moves.

THE EXTENDED VISUAL CONTROL SYSTEM

Maneuvering range is greatly increased by adapting the remote controls for mounting and use with visual aids, such as radar and optical devices. FIGS. 4 and 5 illustrate use with binocular field glasses and FIG. 6 shows a unit adapted to use with a monocular telescope.

To adapt the basic remote control system of FIG. 3 to extended range, we provide a switch and a connector on the standard commercial transmitter 140, as shown in FIG. 7. Switch 176 has two closed positions. In its upper closed position, the switch provides the circuitry of the transmitter which it has as purchased from commercial outlets. In its lower closed position, switch 176 disconnects two of the encoders from the transmitter's own controls and connects conductors 172 and 174 with the connector 180, shown as having five sockets. Connector plug 182 has five prongs which engage the five sockets of connector 180.

Switch 176 and connectors 180, 182 put the transmitter under the control of a pair of external potentiometers housed in a single housing 206 for use with a monocular device as in FIG. 6; or under the control of two potentiometers housed in separate housings 158 and 160 as shown in FIGS. 4 and 5, for mounting on a binocular visual aid.

Control signals are then broadcast by transmitter 140 as before, with the difference that the observer-operator has the controls at finger-tip reach and maneuvers the vehicle in accordance with observation through the visual aid, thus greatly extending the tactical range of the training field.

We wish it to be understood that we do not desire to be limited to the exact details of construction shown and described for obvious modifications will occur to a person skilled in the art.

We claim:

1. A track-laying miniature target vehicle simulating a combat tank in appearance and having an exoskeletal basic supporting structure, comprising:
   a. a metal five-sided box open at the bottom;
   b. Two supporting axles mounted on opposite sides of the box approximately midway between the ends of the box and in axial alignment, each axle supporting two road wheels for rotation on a common axis by means which secure the two road wheels against relative rotation;
   c. a second axis of rotation adjacent one end of the box;
   d. fifth and sixth road wheels, one on each side of the box coplanar with one of said two road wheels on the same side of the box and mounted on the box for rotation on said second axis of rotation;
   e. a pair of drive means, one for each of the fifth and sixth road wheels, carried by the box closely adjacent to its associated road wheel and drivingly connected to it;
   f. a third axis of rotation adjacent the end of the box opposite to that of said second axis;
   g. seventh and eighth road wheels, one for each side of the vehicle;
   h. means mounting the seventh and eighth road wheels for rotation on said third axis, each of said seventh and eighth road wheels being coplanar with the remaining one of said two road wheels on the same side of the box;

i. first and second drive belts connecting the fifth and sixth road wheels respectively with their corresponding coplanar road wheels;

j. third and fourth drive belts connecting the seventh and eighth road wheels respectively with their corresponding coplanar road wheels; and k. a bottom plate secured to the open side of said box at the bottom thereof, said plate having extensions at each end forming ramps with extend upward and away so as to constitute approach ramps as determined by the direction of motion.

2. A vehicle as in claim 1, wherein:

a. the drive means includes an electrical energy cell, an electric motor, and switchgear comprising a proportional speed control connected to receive electrical energy from the energy cell and to transmit electrical energy to the motor;

b. a signal processor connected with the proportional speed control and adapted to receive radio signals; and c. a radio transmitter for broadcasting radio signals to said processor.

3. A vehicle as in claim 2, and an auxiliary control device electrically connected to the radio transmitter and cooperable with a visual aid instrument, whereby an operator who is in remote control of the vehicle observes the vehicle by means of the visual aid instrument and directs the vehicle in accordance with observations made through the visual aid instrument.

4. A vehicle as in claim 1, wherein each of the wheels is a pulley having a peripheral V-shaped groove, and each endless track is a V-belt engaging the grooves of its associated two wheels.

5. A vehicle as in claim 1, wherein said common axis on one side of the vehicle is coincident with the corresponding common axis on the other side of the vehicle.

* * * * *